Nov. 12, 1946.  A. WINTHER  2,411,122
ELECTRICAL COUPLING CONTROL APPARATUS
Filed Jan. 26, 1944   3 Sheets-Sheet 1

Anthony Winther,
Inventor.
Haynes and Koenig,
Attorneys.

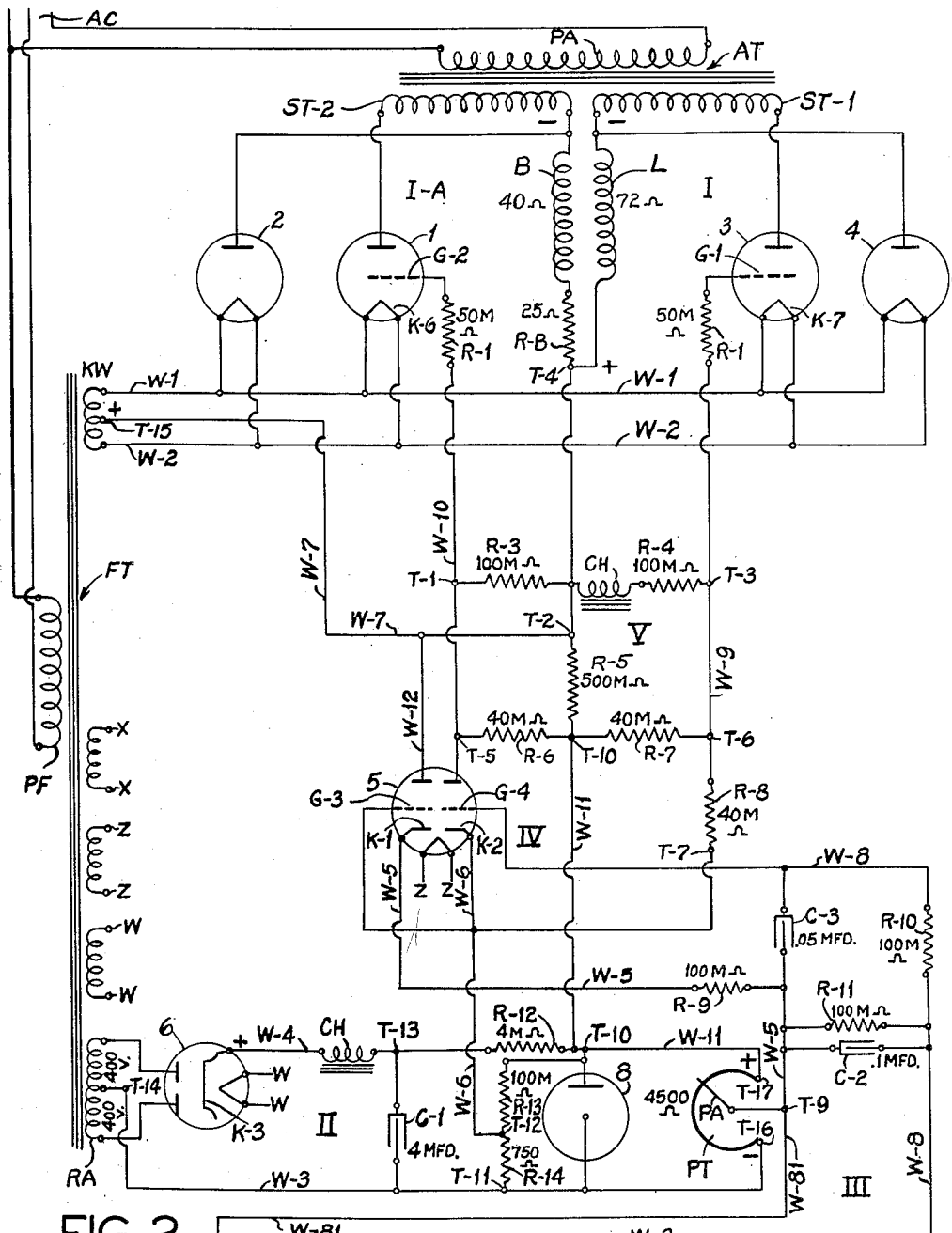
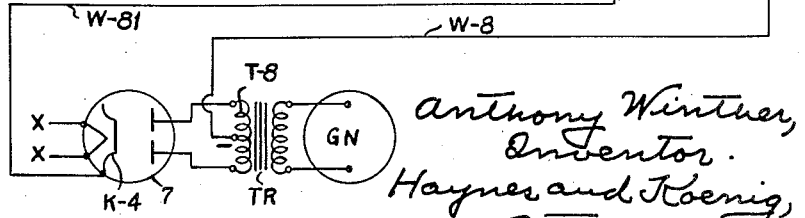
FIG. 2.

Nov. 12, 1946.   A. WINTHER   2,411,122
ELECTRICAL COUPLING CONTROL APPARATUS
Filed Jan. 26, 1944   3 Sheets-Sheet 3

Patented Nov. 12, 1946

2,411,122

UNITED STATES PATENT OFFICE 2,411,122

ELECTRICAL COUPLING CONTROL APPARATUS

Anthony Winther, Kenosha, Wis., assignor to Martin P. Winther, as trustee

Application January 26, 1944, Serial No. 519,783

20 Claims. (Cl. 172—284)

This invention relates to electrical coupling control apparatus comprising a transfer control circuit and its controlled apparatus, and with regard to certain more specific features to a circuit for controlling and quickly transferring electrical energization from one electrical load requiring direct current excitation to another requiring it, such as in certain operating combinations of electromagnetic slip clutches, brakes, dynamometers and the like.

Among the several objects of the invention may be noted the provision of a transfer circuit which will quickly accomplish transfer of current energization from one exciter to another, for example in coupling, brake and dynamometer apparatus of the electromagnetic types, transfer being in response to load or incipient speed changes, the provision of apparatus of the class described which will exert accurate speed control functions on a driven member over a wide range of speed reductions; the provision of a circuit of the class described which is particularly applicable to transferring excitation loads between exciters of various units such as dynamometers, slip clutches and brakes of the electromagnetic types, in order to obtain said accurate speed control of units driven therethrough even under conditions of wide variation in mechanical load; and the provision of a circuit of the class described which will effect reliable transfer operation under both light and heavy excitation requirements. Other objects will be in part obvious and in part pointed out hereinafter.

The invention accordingly comprises the elements and combinations of elements, features of construction, and arrangements of parts and circuits which will be exemplified in the devices hereinafter described, and the scope of the application of which will be indicated in the following claims.

In the accompanying drawings, in which are illustrated several of various possible embodiments of the invention, Fig. 1 is a schematic layout showing one application of the invention to a grinding machine;

Fig. 2 is a main wiring diagram;

Fig. 3 is an auxiliary wiring diagram of selected parts of Fig. 2, rearranged to display certain bridge-circuit relationships;

Similar reference characters indicate corresponding parts throughout the several views of the drawings.

Figure 1:
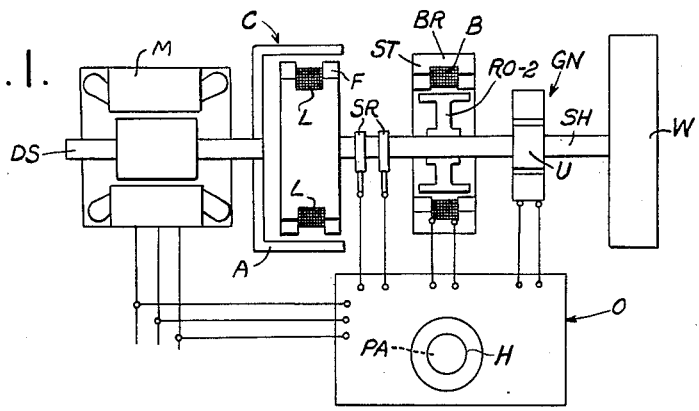

Referring now more particularly to Fig. 1, M is an A. C. motor having a drive shaft DS driving the armature A of an eddy-current, electromagnetic slip clutch C. At F is the driven field member of clutch C having field winding L. This winding L is energized from a circuit to be described, via slip rings SR. The field member is carried on drive shaft SH. Shaft SH also carries an attached armature RO—2 within a field member ST of an eddy-current electromagnetic brake BR. Brake BR has a field winding B. On the shaft SH is carried the armature U of a small, permanent-magnet, speed-responsive, control generator GN.

Shaft SH is coupled in driving relationship with a grinding-wheel load W, which is one, but not the only, example of the type of mechanical load governed by the apparatus of the invention. It is illustrative of a mechanical load member which may tend to overrun, or drop its load completely from the driving member, and which should have its speed governed. It is a development in modern grinding machines. In these machines the work to be ground is driven in the same tangential direction at the point of contact with the grinding wheel as the periphery of the wheel, and overrunning it, whereby a better finish is obtained, which is more accurate, and of a higher degree of polish. However a difficulty is involved during certain parts of the operation, as for example when the grinding is very light. Under such conditions the work tends to overdrive the grinding wheel, with which it has direct contact. The result is that the grinding wheel tends to rotate faster than it should for best results. Therefore it is necessary not only to have a source of power to drive the wheel, but the same source should be capable of retarding the wheel and holding it at a given rotary speed against overdriving. The present invention will, among other things, accomplish this.

Fig. 1 is a schematic arrangement illustrating the application of the invention to such a load. The A. C. induction-type motor M operates the drive shaft DS. This drives the driven shaft SH through the electric slip coupling or clutch C of the eddy-current type identified above. The armature A is an eddy-current member surrounding a radiating polar field from field coil L. The toric flux field generated by annular coil L and the polar member F interlinks armature A in which flux-reactive eddy currents are generated. The degree of electro-magnetic coupling depends upon the field strength of coil L and hence upon its excitation. The rotor RO—2 of brake BR is an eddy-current member within a surrounding polar field emanating from brake coil B. The toric flux field generated by annular coil B and the fixed polar member ST interlinks the rotor RO—2 in which reactive eddy currents are engendered. Thus energization of the coil B may produce a retarding effect on the shaft SH. The circuits to be described are carried in a box O on which is a control handle H for a potentiometer arm PA to be specified. The transfer circuits respond to current from generator GN to transfer excitation between coils L and B for closely controlling speed of the shaft SH under even the most adverse conditions of mechanical and other load variations.

Detailed examples of eddy-current clutches such as C are shown in U. S. patents, 2,286,777; 2,286,778; 2,287,953 and others. Detailed examples of eddy-current brakes such as BR are shown in U. S. patents, 2,286,777; 2,306,582 and others. A permanent-magnet generator such as GN is shown in U. S. Patent 2,277,284.

Hereinafter potentials and current flow will be treated in terms of the movement of negative electrons in the respective circuits. For example, an element in a tube from which negative electrons emanate will be designated negative; an element which they enter will be designated positive. Also, if negative electrons are copiously available to a first element and not to a second element of the same circuit, then the second element will be considered to be positive relatively to the first.

Referring more particularly to Fig. 2, the circuit sections I and I—A are the principal rectifying portions of the circuit. Circuit II constitutes a reference voltage circuit; III, a governing circuit; IV, an amplifier circuit; and V is a bridge circuit.

In circuit I, which is in a principal rectifier section, is a grid-controlled clutch control rectifier tube 3 and discharge tube 4, together with clutch excitation load L. In the present example, the load L is the D. C. excitation coil of the electromagnetic, eddy-current slip clutch C of Fig. 1.

At I—A is shown a parallel related and similar rectifier section in which is a grid-controlled brake control rectifier tube I and a discharge tube 2, together with load B. Load B is the excitation coil of the electromagnetic, eddy-current brake BR of Fig. 1, for example. An object, as indicated above, is to transfer excitation or electrical load from the coil L to the coil B, and vice versa in response to certain changes, such as mechanical load changes, incipient speed changes, or both, the object being to hold the speed of shaft SH substantially constant despite said changes. For best control this requires from time to time quick transfer of the excitation load from one to another of the clutch and brake exciting units L and B. Excitation of L tightens the clutch coupling for acceleration upon incipient speed decrease (brake B deenergized). Excitation of B increases braking for deceleration upon incipient speed increase (clutch C deenergized).

The tubes I and 3 are both grid-controlled gas-filled tubes, commonly used for power applications and characterized by the fact that although the grid of each tube can start the anode current, the grid cannot shut it off. However, when the alternating anode voltage passes through zero, the current dies out automatically. The effect of the grid action is to start the respective tube firing at one point or another on one swing of the A. C. anode voltage wave. Different total average D. C. currents are passed as determined by the grid action.

The tubes 2 and 4 are similar but are not grid-controlled, as indicated in the drawings. They are rectifiers of substantially the same current capacity as tubes I and 3.

At AT is shown an anode transformer having a primary PA and secondary components ST—I and ST—2. The primary PA is connected across one phase of a three-phase A. C. supply circuit AC. Thus the secondary component ST—I applies an alternating voltage to the anode of tube 3. Whenever the grid G—I and anode of tube 3 are positive enough, its cathode K—I passes current toward the anode and through the clutch coil L, to points T—4, T—2, wire W—7 and midpoint T—15 of a cathode secondary component KW of a general supply transformer FT. It then returns to the cathode K—7 of tube 3 via lines W—I or W—2. The primary PF of transformer FT is connected across another phase of the A. C. supply. Thus the tube 3 becomes a half-wave rectifier and the current flowing through it occurs only within that period of the A. C. cycle when the grid-controlled anode of tube 3 is positive.

Since coil L has a relatively high inductance and since it is in a direct current unit, energy is stored in it during the period in the cycle of current increase. When rectified current ceases to flow from the tube 3, this stored energy in the coil L and the voltage, by the incipient collapse of the flux surrounding the coil, has a tendency to prolong the current in the same direction in the circuit last above enumerated. However, since the tube 3 is non-conducting when the anode becomes negative, this follower current from the coil L by-passes tube 3 and takes a path through tube 4 which was inactive when the tube 3 was active. Tube 4 is inactive during the time that tube 3 is active, because the anode of tube 4 is connected to the negative terminal of AT when the anode of tube 3 is positive. Thus under the tendency of coil L to discharge, tube 4 prolongs the current through the coil. The result is that an average current in coil L may be maintained with substantially no interruption until desired, even though the tube 3 is a half-wave rectifier. The passage of current through tube 4 is substantially determined by the value of the current established by the tube 3.

The object of the tube by-pass arrangement is three-fold: (1) It effects economy in each rectifier system by using only one grid-controlled tube, which is more expensive than the gridless rectifier; (2) it relieves rectifier tube 3 of high inverse voltage which the direct current would otherwise apply to its cathode and anode during reversal of the A. C. cycle of potentials applied to the tube 3; and (3) it simplifies the circuit. In short, the use of the tube 4 is as a plain rectifier which serves to discharge the coil L through a low-resistance by-pass, thus economizing tubes, circuit parts and relieving otherwise injurious inverse potentials on tube 3. In practice the control of a rectifier system such as described is substantially as sensitive and as flexible as if both tubes such as 3 and 4 were grid-controlled.

Tubes 1 and 2 in section I—A are similar respectively to tubes 3 and 4 and are similarly related in a parallel circuit as shown. In this case the second component ST—2 of the anode transformer AT connects between the anode of tube 1 and the brake control coil B and thence through a resistance R—B to the point T—4. The operation of this tube 1 in feeding direct current to the coil B, in connection with the plain rectifier tube 2 will be obvious in view of the drawings and the above discussion in connection with tubes 3 and 4. It will be noted that any current flowing through coil B also flows through resistance R—B.

A reference voltage is established by means of the circuit II about to be described. The purpose of this is to set a level of potential for controlling the grids of tubes 3 and 1 of the principal rectifier circuits I and I—A. It should be noted at this point that the reference voltage may be applied directly to the grids G—1 and G—2 or, as in the present example, indirectly through an amplifier tube such as at 5. The reference voltage circuit II originates in a secondary component RA of the transformer FT. Rectified negative current issues from the cathode K—3 of tube 6, induced by the action of transformer component RA. The cathode is heated by connections W—W from another secondary component of RA, as indicated. This sends current during one part of the cycle through point T—14, one leg of the transformer RA, line W—3 to junction point T—11. At this point the circuit branches. One branch leads through a resistance R—14 to point T—12 (by-passing a resistance R—13) and then via wire W—6 to cathode K—2 of amplifier tube 5. The other branch leads to and through a potentiometer PT and thence through line W—11, point T—10, resistance R—12, point T—13, choke CH, line W—4 and back to the cathode K—3, thus completing the circuit.

The resistor combination R—13, R—14 is in effect a voltage divider. The point T—12 has a relatively negative potential which (according to the resistance values indicated on the drawings) is less than the full negative potential of point T—16 in the potentiometer PT. Thus the arm PA of the potentiometer PT can bring its connecting wires W—5 (connected to cathode K—1 of tube 5) to a more negative value than wire W—6.

Tube 8 is a cold cathode tube. This constitutes an automatic resistance leak in circuit II and, due to its inherent characteristics, has a function under certain conditions of causing a relatively short circuit across certain potentials to which it may be connected. Thus, if the voltage across the circuit of the tube 8 tends to rise unduly above the circuit rating, the tube becomes more conductive and relieves its connected circuit of enough current to suppress more than an incipient voltage rise. In the present case this holds the connected reference voltage circuit II substantially steady at adjusted rating. Choke CH and condenser C—1 effect the usually desired filtering of the reference voltage circuit II. The effect of the resistance R—12 will appear hereafter.

Hence, by means of the potentiometer arm PA, manually controlled potentials may be applied to point T—9 in governor circuit III to be described. Once manually set, a given potential is substantially constant. If arm PA is turned to point T—16, then T—9 will become fully negative and all directly connected circuits will be copiously supplied with negative electrons. If the arm PA is turned to the terminal T—17, then all connected circuits will be relatively positive, being starved of negative electrons.

Returning to the first position of arm PA, namely T—16, if the arm PA is placed at that point, the cathode K—1 of tube 5 becomes substantially fully negative (via W—5 including R—9), but the free flow of the negative current is impeded by resistance R—9. Relatively the grid G—3 of tube 5 will be positive, and the negative current will flow from cathode K—1 to the respective anode of tube 5 and to line W—12 connected therewith. The effect of this will be shown. Tube 5 is heated by connections Z—Z to its cathode from a secondary component of transformer FT.

Generator GN is used to feed the governing circuit III in a proportion to generator speed, that is, in proportion to the speed of the driven shaft SH (Fig. 1). The proportion need not necessarily be a direct one but such is preferable. The circuit III is energized from generator GN through a transformer TR. Basically the circuit starts with a flow of negative electrons from the cathode K—4 of the tube 7 and passes through the secondary T—8 of the transformer TR. (The cathode is heated over connections X—X from a secondary component of transformer FT.) From transformer TR current passes through W—8, including resistance R—10, to the grid G—4 of tube 5. Return is effected through the cathode K—2 of tube 5, line W—6, point T—12, resistance R—14, point T—11, point T—16 of the potentiometer PT, returning finally via arm PA, point T—9 and W—81 back to the cathode K—4 of tube 7. A parallel part of this circuit may be traced as follows: cathode K—4, to an anode of tube 7, point T—8 of transformer TR, W—8 resistance R—11, point T—9, and back to the cathode K—4 of tube 7 via W—81. Suitable condensers C—2 and C—3 parallel the resistances R—11 and R—10 respectively.

Upon moving the potentiometer arm PA from T—16 toward T—17, the clutch coil L, as will appear, is increasingly energized, thus tightening the magnetic clutch coupling and causing the driven shaft SH to increase in speed. This increases the speed of the generator GN. At some point the arm PA is brought to rest and under such conditions a definite potential will be obtained, which bears a definite relation to the potential which is obtained at point T—16. Since the potentials generated by the generator GN are then below that set by the arm PA, the setting of PA determines the speed to which the clutch will accelerate its driven member and the generator, a balance occurring finally as will appear. Also, if at a given setting of arm PA, the mechanical load on the machine driven by the clutch C is decreased, the shaft SH will accelerate. In other words the speed fixed by the energization of load coil L (at a greater load) will increase at the lower load. The generator GN will again gain in voltage due to the speed increase.

Cathode K—2 of tube 5 operates at a fixed negative potential because it is permanently connected to T—12 through wire W—6. Its negative potential is about 1.12 volts less negative than the point T—16; or, point T—16 is 1.12 volts more negative than T—12. Thus, even taking the resistors R—10 and R—11 into account, a relative negative potential can be applied to the grid G—4 by turning arm PA to point T—16. This makes the grid G—4 1.12 volts more negative than cathode K—2 and the tube 5 becomes entirely shut off. Whenever PA is moved clockwise toward T—17, the grid G—4 first reaches zero potential with respect to cathode K—2 and then becomes relatively positive. Thereupon grid G—4 fires cathode K—2 which supplies negative electrons to grid G—2 of the brake exciter tube 1. This shuts off tube 1 and shuts off excitation of the brake coil B.

When cathode K—2 passes negative electrons to point T—5 a copious supply of these pass through resistor R—6 to the point T—10 and then back into the cathode K—3 of tube 6 via W—11, R—12, T—13, choke CH and W—4. Simultaneously the system T—5, T—1, R—3, T—2, W—7, T—15, W—1, K—7 fills with negative electrons to the theoretical (static) potential of minus 140 volts as referred to T—10, there being a loss of 10 volts across tube 5 and R—6. There is also a drop of 150 volts across R—8 and R—7. T—6, being at half potential between that of the ends of R—7 and R—8, has a potential of minus 75 volts with relation to T—10. Hence T—6, being connected to grid G—1 of tube 3 through resistor R—1, is 75 volts plus compared to 140 volts minus for cathode K—7. This makes grid G—1 of tube 1 positive to the cathode K—7 therein and tube 3 therefore fires and energizes coil L.

The above goes on until the speed of the output shaft SH and the governor GN rises to a point where the voltage of governor GN overbalances the voltage set by the potentiometer PA. That is, when the voltage of the generator GN rises high enough upon building up of speed, sufficient negative electrons will issue from the cathodes KJ4 of the tube 7 and, by means of the wire W—8, the grid G—4 of tube 5 will become more negative than the T—9 potential, because the current through the resistor R—11 will be reversed. Furthermore, the negative potential through wire W—8 will dominate, causing the above-described anode currents to diminish or shut off completely. The negative electrons from point T—12 will pass through wire W—6 and wire W—9 and will again dominate at the grid G—1 of tube 3 and shut off this tube.

At this time the bridge system V coupled with circuit IV operates so as to make the grad G—2 of the brake rectifying tube 1 relatively positive, thus firing it and operating to energize the brake coil B. Details will be described presently. As shown, when the generator GN gains voltage it shuts off tube 3 by action of grid G—1. Since the principal rectifying system I—A is similar in operating characteristics to the rectifying system I, instead of applying full excitation to the brake coil B, the system tends to govern the braking effect exactly as described in connection with the load coil L. This braking effect is maintained until the machine is brought back to the original speed set by the potentiometer PA and, if the speed then continues to drop further, the principal rectifier circuit I will take over the function of governing through circuit I, the circuit I—A being again released.

The circuit V may be called a bridge transfer circuit which operates in conjunction with the rectifier circuit I and I—A. Its object is to "tilt" or shift the operating potentials instantaneously from grid G—1 in tube 3 to grid G—2 in tube 1 to accomplish transfer of operations between these two. To clarify it and its operation, Fig. 3 has been drawn to emphasize the bridge relationships. The reference characters correspond. Only those elements have been shown on Fig. 3 which actually control the system, including the two components of tube 5 which are shown for clarity in two separate units 5a and 5b. The electric bridge and related circuits are stripped of all auxiliaries so as to permit relatively simple analysis of the fundamentals.

From Fig. 3 it will be seen that a bridge is defined by three resistances R—6, R—7, R—8 and the element 5b of the tube 5. The impedance of this element 5b supplies resistance.

A reference voltage (150 volts for example) from W—6 and W—11 of circuit II is connected across the bridge at T—7 and T—10. If all of the sides of the bridge were to have the same resistance, the voltage drop from T—7 to T—6 would be equal to one-half the total, and an equal drop would occur between T—7 and T—5. However, when the tube elements 5b are not operating they have practically an infinite impedance so that, with the grid G—4 fully negative, the voltage from T—5 to T—7 is 150 volts, with no current flowing through R—6.

Assuming a starting condition, with the arm PA of the potentiometer PT on point T—16, negative is supplied from T—16 through W—5, resistance R—11 and to grid G—4 of tube elements 5b. The grid G—4 becomes fully negative and the tube elements 5b become inoperative. The result is the stated potential of 150 volts across the cathode K—2 and anode of said tube elements 5b in the bridge.

In the meantime, however, tube elements 5a pass current because the grid G—3 operates at nearly full capacity at grid to cathode potential between zero and minus two volts, due to the tube characteristics. As a result negative electrons leave the cathode K—1 and pass through tube elements 5a and enter the cathode K—6 of brake rectifying tube 1, the grid G—2 of which is fully positive (150 volts plus). Hence the tube 1 excites the brake coil B.

If the arm PA is turned clockwise, the potential of wire W—5, resistance R—11 and grid G—4, is increased positively, so that the grid G—4 becomes relatively positive and the tube elements 5b come into action, or fire. At the same time the cathode K—1 of tube elements 5a becomes more positive, making grid G—3 negative and stopping current flow through the tube elements 5a. The tube elements 5b, when operating, having a lower impedance than resistance R—8, results in drop of the potential of point T—5 to less than that of brake rectifier tube 1 at the operating conditions under consideration so that (and this occurs progressively) the tube 1 reduces its brake excitation.

At the same time the drain by tube elements 5b will drop the potential from T—5 to T—7, for example from 150 to 10 volts. Under balanced conditions, the potential between T—6 and T—5 is 75 volts, because the potential of T—5 is the same as that of T—10. Hence as between wires W—10 and W—9 (T—5 to T—6) conditions change from say W—10 at plus 150 volts and W—9 at plus 75 volts, to a condition wherein wire W—10 is plus 10 volts and wire W—9 is plus 75 volts, or relatively, wire W—9 is 65 volts higher in potential than wire W—10. Since resistances R—3 and R—4 divide this voltage, point T—2 becomes 32.5 volts negative to T—3 and T—6. Therefore, grid G—1 in clutch tube 3 becomes positive in relation to its cathode K—7 and therefore tube 3 fires, thus energizing the clutch coil L. This tightens the magnetic coupling with the output shaft SH and accelerates the generator GN. As the voltage of the generator GN builds up, negative electrons originate at K—4 and pass to the anode of the tube 7, through the secondary winding of the transformer TR, resistance R—10 and to grid G—4 of tube elements 5b. This tends to make the grid G—4 relatively negative and causes tube elements 5b to diminish in activity. The process continues, causing close regulation of the clutch output speed.

As above indicated, if the load on the clutch C becomes overrun or lost, the output shaft SH also speeds up, causing the generator GN to charge the grid G—4 still more negatively, thus entirely shutting off the tube elements 5b. This returns the bridge circuit to the original condition wherein grid G—2 of the brake rectifying tube 1 is positive and the brake thus becomes energized. Under these conditions also, the clutch rectifying tube 3 is shut off because point T—6 becomes relatively negative to T—2, G—1 being negative to its cathode K—7, whereupon tube 3 is completely shut off. As soon as the brake BR is energized and on, the governor GN governs the braking effect because as speed falls off the action is through tube 1.

Thus it will be seen that the generator GN governs and controls both the clutch coupling and the brake action, that is, it controls both an accelerating and a decelerating action. This tends to maintain a closely constant speed of the output shaft SH regardless of either relatively slight changes in load or radical changes in load, including the entire removal of load. The system not only will apply the brake if the load shaft SH tends to increase in speed due to lightening of load, but also if the load shaft SH tends to overrun and drive the eddy-current coupling and brake. Under the latter condition the brake will apply sufficient retarding force to regulate the overrunning or overdriving of the load so as to maintain substantially the original speed as set by means of the potentiometer PT.

The advantages of the invention do not accrue to prior systems in which a governor simply tightened and loosened a magnetic slip coupling between the driver and the driven load member. This is because, for one thing, these old systems had no controlled means for retarding the driven member which was responsive to governing. Retardation simply was effected by the mechanical load carried, and if this load were dropped, the friction might not be enough to slow down the apparatus quickly enough. By means of the present invention the brake control action is applied to decelerate, in addition to the deceleration normally caused by a load. Thus under any conditions speed control is much more prompt and close than heretofore.

By means of the invention the load at the output shaft of the clutch can be held closely at a definite speed, regardless of whether the driven machine loads the systems or attempts to drive the system. In practice, the transition from driving the load, to retarding it, is substantially imperceptible, except by means of an ammeter in the A. C. induction motor leg, which meter indicates that at one point the motor takes power, and in the other, no power except magnetizing current.

Returning to more detailed operation of the machine, starting from standstill a bias for complete shutoff of tube 3 must exist and is provided thus: T—10 is fully positive in relation to T—7 (150 volts). T—6 is 75 volts positive to T—7. The circuit R—5, R—4, R—8 (a path for the biasing circuit) when calculated for 150 volts indicates that point T—2 is 117 volts plus, and T—3 is 94 volts plus. Hence, grid G—1 is negative by 23 volts to its cathode K—7 which is connected to T—2. All this occurs under static conditions. When tube section 5b operates, this condition (statically considered) is reversed, so that T—3 and G—1 become 32.5 volts positive to T—2 and K—7, as above explained.

Actual conditions when governor GN operates are such that tube section 5b, being continually modified, the grid potential at G—1 to K—7 of tube 1 may function with a a difference of only 2 or 3 volts rather than the larger values stated.

Now, again reconsidering the fact that the basic bias at standstill is: T—3 to T—2, G—1 to K—7, 23 volts negative, and such basic bias at running condition is T—3 to T—2, 32.5 volts positive, nominally a difference of 55.5 volts. Since, as above explained, actual operating conditions narrow this down, let us assume that this difference is such as to reduce the voltage spread to 9.5 volts while running and governing. This is the spread between the absolute values under the static conditions. The basic variation each side of zero is not even 23.5 negative to 32.5 volts positive. This requires that, on turning the potentiometer PA toward a lower speed there will not be an instantaneous transfer measured in degrees of movement of the potentiometer arm. For example, since all rheostats or potentiometers are crude, a very slight movement or imperfection of contact would cause the difficulty of instantaneously applying the brake. However, by means of the above uneven biasing, it becomes necessary to move the potentiometer at least enough to be equivalent to 5 or 10 R. P. M. change on the governor speed (and hence its voltage) so that with ordinary operation only an intentional change on the part of the operator will bring into action the braking effect.

Tube section 5a is also used as a stabilizer of action at very low driven speeds. When the speed of the output shaft drops to low values, as say 10% of the maximum, in some uses the load may be so light as to cause instability of regulation by the governing circuit. In this case, it is desirable for stabilization to apply the brake to add a small brake load to the mechanical load. When the arm PA is turned to a low value, as at position 25 in Fig. 3, the cathode K—1 of section 5a, reaches a potential at which tube section 5a can operate (a small negative difference between K—1 and G—3 is required) so that this action occurs: Electrons issue from K—1, through the anode of section 5a, wire W—12 to cathode K—6 in tube 1. Thus K—6 becomes more negative than before as related to G—2 and T—5. This is the same as making G—2 plus as regards K—6, so that tube 1 acts, applying a load.

As arm PA is turned more toward T—16, this effect increases. By this means, it is possible to obtain a closely controlled speed reduction of say 60 to 1 on the output shaft of the eddy-current clutch, producing a stable rotation at such low speeds, and this action further can be controlled manually by manipulating arm PA.

Another feature is that every movement of the arm PA to a lower speed position is itself accompanied by a braking effect thus accomplishing automatically a rapid deceleration. This is quite valuable on many production machines other than the grinders mentioned. Where machine inertias are large, this braking effect on the slow-down may effect substantial savings in time and reduction of costs. For example, on one textile machine, the time for deceleration has been cut for rapid successive deceleration periods from 12% of the total operating time of 1.6%.

Exemplary electrical values of various circuit items appear on the drawings. Exemplary commercial designations of the tubes above discussed are as follows:

| Tubes | Designation |
| --- | --- |
| 1 and 3 | ELC1B |
| 2 and 4 | EL3C |
| 5 | 7N7G |
| 6 | 6X5GT |
| 7 | 6X5GT |
| 8 | VR-105 |

Figure 4:
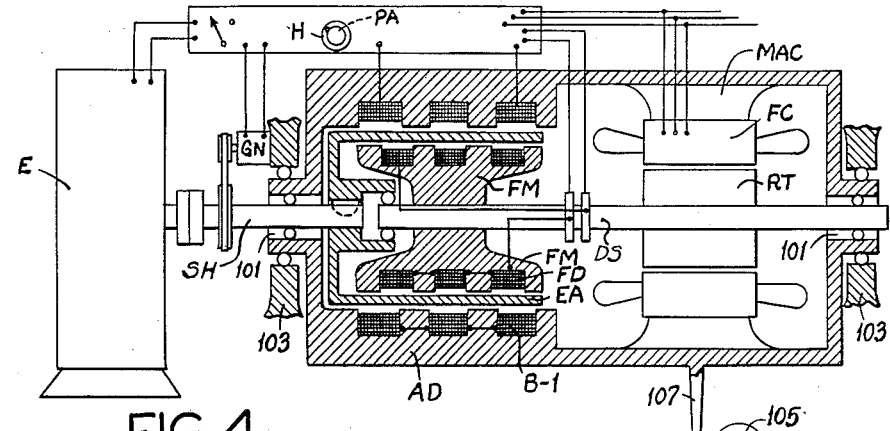
Fig. 4 is a diagrammatic layout showing another application of the invention to engine-testing dynamometer apparatus.

Another valuable application of the circuits herein disclosed is shown in Fig. 4. This has to do with the testing of internal combustion engines by means of a combination of absorbing and a motoring dynamometer apparatus. The absorbing and motoring elements of the machine may be in one or different units but the former is indicated in Fig. 4. In Fig. 4, AD is a polar field stator which rocks on trunnions 101 in a frame 103. Resisting moments of this stator are applied to a registering scale 105 by a torque arm 107. The exciting field is shown at B–1. The driven shaft in this case is again indexed SH. It rotates in stator AD and is driven from engine E to be tested. Coupled on the same shaft SH within stator AD is an eddy-current armature EA. When field B–1 is energized a polar field from AD links B–1 to set up magnetically reactive eddy currents and heating in EA. Thus energy may be absorbed from E and measured at 105. The heat may be carried off in any of the usual ways (not shown).

Within armature EA is a polar field member FM on a drive shaft DS which carries the rotor RT of an induction motor MAC. The field coils of FM are shown at FD. When FD is energized a polar field from FM links armature EA setting up reactive eddy currents therein. Thus EA may be driven by its electric slip coupling with FM. The field FC of motor MAC is attached to stator AD. It is intended that the field member FM shall be driven at a constant speed from armature RT, but that the armature EA be driven at any speed required of the shaft SH to drive the engine E. Thus when field B–1 is energized (FM dead), AD and EA constitute an absorbing dynamometer having in effect a brake action on EA.

When FD is energized (B–1 dead) there is a slip coupling between RT and EA. Since motor MAC has its stator supported in the inside of stator AD, driving may occur from the motor and the reaction torque due to driving measured at 105. This makes these elements a motoring dynamometer. With apparatus of this class it is possible to load the engine E by means of the absorbing dynamometer elements AD, EA when B–1 is properly energized and motor RT is de-energized. When desired the absorbing combination AD, EA may be cut off and the motoring element EA, FM used to drive the engine E from RT through the shafts SH and DS, the dynamometer elements being under these conditions de-energized.

Quite often engine testers want to know the exact friction of an engine which has been running for some time at a fixed load and speed and at a given temperature and lubricating conditions. For example, if an engine capable of a maximum speed of 2800 R. P. M. at 2000 H. P. has been operated at full speed for the period of an hour, it is quite important to know definitely and as precisely as possible how much friction loss there is in the engine under the conditions of operation. If the engine can be cut out of power operation along with the dynamometer AD, and instantaneously driven from the motor, then calculations from the reaction torque on AD will give the friction horsepower at the instant and under the conditions existing at the time the engine was fully loaded.

Referring to the diagram of Fig. 4 it is clear that if coil B–1 is energized and the engine E is driving at full load and full speed, it will be quite valuable to be able to operate the motor RT without energization of the field FD, and thus to prepare it for a quick test of friction horse power by changing from absorbing to motoring conditions. Thus, the armature EA will be rotating continuously during operation of the absorbing dynamometer combination EA, AD; but no coupling will exist between EA and the field member FM. Then by employing an electronic control such as here described, a single element in the hands of the operator can be made to shut off the engine ignition and fuel and simultaneously cut off excitation of coil B–1 while cutting in excitation of coil F–D, and then the motor MAC takes over the function of driving the engine E at practically the same speed as it was acting under load. This involves the same problem as in the example above given, namely, that the system becomes suddenly unloaded, except for the friction horse power, under which conditions is desired a substantially instantaneously controlled and governed transfer between absorbing and motoring conditions. Thus coils B1 and FD in Fig. 4 are the equivalents of coils B and L respectively in Fig. 1, so far as the circuits of Figs. 2 and 3 are concerned.

It should be understood that mechanically considered, some or all of the absorbing dynamometer elements shown in Fig. 4 may be separated from the motoring dynamometer elements.

Figure 5:
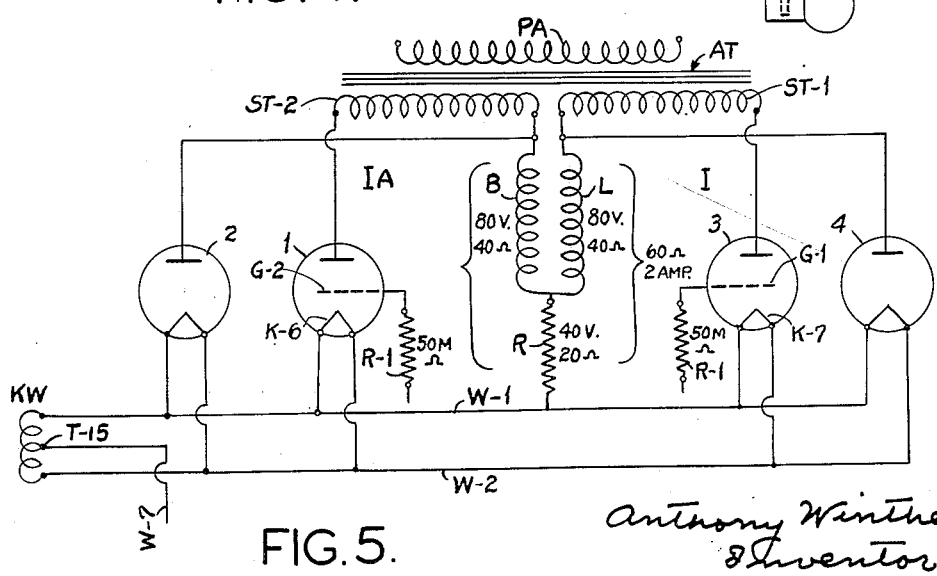
Fig. 5 is a reproduction of a part of the main wiring diagram of Fig. 1 showing alternative connections for accelerating load transfer, particularly in applications such as shown in Fig. 4.

In Fig. 5 is shown a scheme for reconnecting the principal rectifier circuits I and I–A for further accelerating the transfer of excitation between coils L and B. Like numerals designate like parts. This alternative is particularly useful for use with apparatus such as shown and described in Fig. 4, wherein very quick transfer of excitation is desirable. It consists in a resistor R connected to the two electrical loads L and B which are to be interchanged by the circuit. The object of this resistance is to apply potential to the coils B and L which is higher than the normal rating of the coils. This involves the dissipation of some of what would otherwise be useful direct current, but this is not important in view of the advantages which accrue in transfer speed.

For example, if the voltage drop across either L or B is 80 volts, as indicated, then 40 volts applied across resistance R will make 120 volts total, either through B and R, or L and R. Usually B and L can be made of the same resistance. Assuming a current of two amperes through the system of either B and R or L and R, it is clear that before this current starts to flow, a potential of 120 volts is applied across L or B, as the case may be. This abnormally high potential reduces the time constant of coil L or B so that the magnetization time is considerably reduced. Thus it will be seen that the loading resistance R becomes a means for hastening full magnetization after load transfer has occurred.

In the example shown in Fig. 5, the entire resistance of one load L and R (for example) is 60 ohms with 40 ohms in L and 20 ohms in R. With 120 volts applied two amperes will flow. The watts lost in coil L will be 160 and in resistance R it will be 80. This loss is functionally compensated for by the accelerated transfer.

In the following claims the term "brake" is intended to describe any apparatus having a resisting or drag effect on a controlled member and includes devices such as the dynamometer elements AD and B—I of Fig. 4, as well as elements such as BR and B in Fig. 1.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In apparatus of the class described, a driving member, a driven member, an electrical driving coupling therebetween, an electrical brake on the driven member, a generator driven by the driven member, an electronic circuit controlled from said generator and adapted to tighten said electrical driving coupling in response to certain lower speeds of the driven member, and adapted to energize said brake in response to certain higher speeds of said driven member and automatic means in said circuit for preventing sudden changes in the application of energy through either said clutch or brake.

2. In apparatus of the class described, a driving member, a driven member, an electromagnetic slip clutch between the driving member and the driven member including a clutch field coil, an electromagnetic brake associated with the driven member including a brake field coil, electronic means responsive to the speed of the driven member for automatically controlling the clutch and the brake operations to maintain the speed of the driven member substantially constant, characterized by the fact that when the driven member incipiently decelerates from a predetermined speed, the clutch coil is energized and the brake coil is deenergized, and by the fact that when the driven member incipiently accelerates from said speed the brake coil is energized and the clutch coil is deenergized.

3. In apparatus of the class described, a driving member, a driven member, an electromagnetic slip clutch between the driving member and the driven member, an electromagnetic brake associated with the driven member, electronic means responsive to the speed of the driven member for controlling the clutch and the brake, characterized by the fact that when the driven member incipiently deviates above a predetermined speed a retarding force is applied to the driven member by tightening said brake and by the fact that in response to deviation of the speed of said driven member below said predetermined value a driving force is applied through the clutch from the driving to the driven member by tightening said clutch, the clutch being deenergized when the brake is energized and vice versa, clutch and brake tightening being in a proportion to the said respective speed deviations.

4. In apparatus of the class described, a driving member, a driven member, an electromagnetic slip clutch between the driving member and the driven member, an electromagnetic brake associated with the driven member, electronic means responsive to the speed of the driven member for controlling the clutch and the brake, characterized by the fact that when the driven member incipiently deviates above a predetermined speed a retarding force is applied to the driven member by tightening said brake, and by the fact that in response to deviation of the speed of said driven member below said predetermined value a driving force is applied through the clutch from the driving to the driven member by tightening said clutch, the clutch being deenergized when the brake is energized and vice versa and means for maintaining some brake energization while the clutch is energized at substantially high speed reductions through the clutch.

5. In apparatus of the class described, a driving member, a driven member, an electromagnetic slip clutch between the driving member and the driven member, an electromagnetic brake associated with the driven member, electronic means automatically responsive to the speed of the driven member for controlling the clutch and the brake, characterized by the fact that when the driven member incipiently deviates below a predetermined speed a driving force is applied through the clutch from the driving to the driven member by tightening said clutch, and in response to deviation of the speed of said driven member above said predetermined value applying a retarding force to the driven member by energizing said brake, the clutch being deenergized when the brake is energized and vice versa, and manually control means in said circuit for determining said predetermined speed.

6. In apparatus of the class described, a driving member, a driven member, means for applying a driving force from the driving member to the driven member, means for applying a retarding force to the driven member, means responsive to acceleration and deceleration of the driven member above and below an optimum speed of the driven member for alternating said applications respectively to the means for applying the driving force and to the means for applying the retarding force, means for effecting gradual application of one or the other of said forces, variable means for changing said optimum speed and means responsive to substantially large ratios of speed drop between the driving and driven members for applying the retarding force while the driving force is effective.

7. In apparatus of the class described, a driving member, a driven member, electromagnetic means including a first field coil energizing a driving slip coupling between the driving and the driven members, electromagnetic means comprising a second field coil energizing means tending to brake the driven member, rectifier tubes each having a cathode, an anode and a grid, the tubes being connected each respectively to feed one of said coils, and means responsive to the speed of the driven member and controlling said grids alternatively to fire the tube connected with the first coil upon incipient drop of speed below a normal speed of the driven member or to fire the tube connected with the second coil upon incipient speed increase above said normal speed of the driven member.

8. In apparatus of the class described, a driving member, a driven member, electromagnetic means including a first field coil energizing a driving slip coupling between the driving and the driven members, electromagnetic means comprising a second field coil energizing means tending to brake the driven member, rectifier tubes each having a cathode, an anode and a grid, the tubes being connected each respectively to feed one of said coils, means responsive to the speed of the driven member and controlling said grids alternatively to fire the tube connected with the first coil upon incipient drop of speed below a normal speed of the driven member or to fire the tube connected with the second coil upon incipient speed increase above said normal speed of the driven member, and means whereby the current passed upon firing of either tube is varied with varying incipient speed changes so as to inhibit said changes according to their magnitudes.

9. In apparatus of the class described, a driving member, a driven member, an electromagnetic slip coupling between the driving and driven members, a first field coil in the slip coupling, an electromagnetic brake operating upon the driven member, a second field coil in the brake, a control generator driven by the driven member, a governing voltage circuit supplied from said generator in accordance with the speed of said driven elements, a reference voltage circuit connected with said governing circuit, a circuit for alternately energizing said coils, a voltage tilting bridge circuit connecting said governing and reference voltage circuits with said energizing circuit and adapted in response to generator speeds below a predetermined value to cause energization of the first coil with deenergization of the second coil, and at higher speeds of the generator above said predetermined value to cause deenergization of the first coil and energization of the brake coil, and circuit means whereby the action of said governing circuit continuously proportions current through either of said coils when energized respectively.

10. In apparatus of the class described, a driving member, a driven member, an electromagnetic slip clutch between said members having therein a clutch coil, an electromagnetic brake means cooperating with the driven member and having therein a brake coil, a generator driven by the driven member, a governing circuit energized by said generator, a manually controlled reference voltage circuit, circuit means for energizing said clutch and brake coils, and a transfer circuit connecting said reference and governing circuits with the energizing circuit so that incipient changes in speed of the driven member above an optimum will cause complete deenergization of the clutch coil and progressive energization of the brake coil in a proportion to the degree of speed increase, and whereby incipient reduction in speed below said optimum will cause complete deenergization in the brake coil and progressive energization of the clutch coil in a proportion to the degree of speed decrease, manual adjustment of said reference voltage circuit being adapted to control said optimum speed, and means whereby said respective energizations of the clutch and brake coils in response to speed changes are operative whether said incipient changes are induced by actuation of said manual control or changes in load on the driven member.

11. In apparatus of the class described, a driving member, a driven member, an electric slip clutch coupling said members, an electric brake operative on the driven member, an energizing clutch coil in the clutch and an energizing brake coil in the brake, a brake coil rectifier tube, a clutch coil rectifier tube, said tubes being grid-controlled, rectifier circuits through said tubes and feeding said coils respectively, a generator driven by said driven member, a governing circuit under control of said generator, a reference voltage circuit coupled with said governing circuit, control means for predetermining the reference voltage in said reference voltage circuit, a transfer circuit connecting said reference voltage and governing circuits with the grids of said tubes, said transfer circuit being capable alternatively of firing one tube while stopping the other, said transfer circuit being operative in connection with the governing and control circuits to fire the brake coil in response to incipient speed change of said generator above an optimum as fixed by said manual control means, and to energize the clutch coil in response to speed change of said generator below said optimum.

12. In apparatus of the class described, a driving member, a driven member, an electric slip clutch coupling said members, an electric brake operative on the driven member, an energizing clutch coil in the clutch and an energizing brake coil in the brake, a brake coil rectifier tube, a clutch coil rectifier tube, said tubes being grid-controlled, rectifier circuits through said tubes and feeding said coils respectively, a generator driven by said driven member, a governing circuit under control of said generator, a reference voltage circuit coupled with said governing circuit, control means for predetermining the reference voltage in said reference voltage circuit, a transfer circuit connecting said reference voltage and governing circuits with the grids of said tubes, said transfer circuit being capable alternatively of firing one tube while stopping the other, said transfer circuit being operative in connection with the governing and control circuits to fire the brake coil in response to incipient speed change of said generator above an optimum as fixed by said manual control means, and to energize the clutch coil in response to speed change of said generator below said optimum, and means whereby the current passed through either of said tubes while firing varies uninterruptedly with the generator speed deviation from said optimum.

13. In apparatus of the class described, a driving member, a driven member, an electric slip clutch coupling said members, an electric brake operative on the driven member, an energizing clutch coil in the clutch and an energizing brake coil in the brake, a brake coil rectifier tube, a clutch coil rectifier tube, said tubes being grid-controlled, rectifier circuits through said tubes and feeding said coils respectively, a generator driven by said driven member, a governing circuit under control of said generator, a reference voltage circuit coupled with said governing circuit, control means for predetermining the reference voltage in said reference voltage circuit, a transfer circuit connecting said reference voltage and governing circuits with the grids of said tubes, said transfer circuit being capable alternatively of firing one tube while stopping the other, said transfer circuit being operative in connection with the governing and control circuits to fire the brake coil in response to incipient speed change of said generator above an optimum as fixed by said manual control means, and to energize the clutch coil in response to speed change of said generator below said optimum, means whereby the current passed through either of said tubes while firing varies uninterruptedly with the generator speed deviation from optimum, and means for continuously passing current through the tube supplying the brake coil to apply an artificial load to the driven member at certain substantially large speed reductions between the driving and driven members.

14. In apparatus of the class described, a driving member, a driven member, an electromagnetic clutch between the driving and driven members having a clutch field coil, an electromagnetic brake associated with the driven member having a brake field coil, a generator driven by said driven member, an electronic circuit having a controlled rectifier section connected to feed said coils alternatively, an adjustable reference voltage section, and a governing section supplied by the output of said generator, an adjustable potentiometer connection between the reference and governing sections, said electronic circuit having a transfer section responsive to voltage changes in the governing section caused by incipient speed deviations of the generator from a predetermined value as determined by the reference section of the circuit for controlling the rectifier section to transfer energization from one to another of said coils and vice versa.

15. In apparatus of the class described, a driving member, a driven member, an electromagnetic clutch between the driving and driven members having a clutch field coil, an electromagnetic brake associated with the driven member having a brake field coil, a generator driven by said driven member, an electronic circuit having a controlled rectifier section connected to feed said coils alternatively, an adjustable reference voltage section, and a governing section supplied by the output of said generator, an adjustable potentiometer connection between the reference and governing sections, said electronic circuit having a transfer section responsive to voltage changes in the governing section caused by incipient speed deviations of the generator from a predetermined value as determined by the reference section of the circuit, for controlling the rectifier section to transfer energization from one to another of said coils and vice versa, said transfer section being also adapted in response to operation of said governing section to proportion the current in whichever part of the rectifier section is operative at a given time, said proportioning being in accordance with the speed of the generator.

16. In apparatus of the class described, a driving member, a driven member, an electromagnetic clutch between the driving and driven members having a clutch field coil, an electromagnetic brake associated with the driven member having a brake field coil, a generator driven by said driven member, an electronic circuit having a governing section fed by the generator and having a connected adjustable reference voltage section, and also having a transfer section connected to the governor and reference voltage sections responsive to incipient generator speed deviations from an optimum value determined by adjustment of the reference voltage circuit, said transfer section effecting controlled transfer of energization from one to another of said coils and vice versa depending upon whether said generator incipient speed deviation is above or below said optimum, and means operative at relatively low adjusted optimum speed of the driven member adapted to maintain some energization of the brake coil under controlled energization conditions in the clutch coil.

17. In apparatus of the class described, a driving member, a driven member, an electromagnetic accelerating coupling between said members having a coupler field coil therein, an electromagnetic brake associated with a driven member having a brake field coil therein, a first grid-controlled tube feeding the coupler coil, a second grid-controlled tube feeding the brake coil, a reference voltage circuit, a governing circuit connected with said reference voltage circuit, a generator responsive to the motion of the driven member and feeding said governing circuit, a transfer circuit connecting said reference voltage and governing circuits with the grids of said tubes and responsive to increased potential above a predetermined value in the governing circuit to affect the grid of the clutch coil tube to shut off current therethrough and responsive to decreased potentials in said governing circuit below said predetermined value to affect the grid of the brake coil tube to shut off current therethrough, and means in said transfer circuit for controlling the relative voltage of the grid of whichever of said tubes is carrying current, the last-named voltage control being in response to voltage changes in the governing circuit brought about by deviation of the governor speed from that which produces said predetermined value of potential in the governing circuit.

18. In apparatus of the class described, a driven member, driving means therefor including an electrical eddy-current coupling, a field coil for the coupling adapted to be energized to effect driving and deenergized to reduce driving, eddy-current drag means associated with the driven member, a second field coil in the eddy-current drag means adapted to be energized to effect a resistance to the motion of the driven member and deenergized to reduce resistance, an electronic circuit connected to said coils and arranged for alternatively energizing them, and a generator driven by said driven member and adapted to control said circuit according to the speed of the driven member.

19. In apparatus of the class described, a driven member, driving means therefor including an electrical eddy-current coupling having an eddy-current member, a field coil for the coupling adapted to be energized to effect driving and to be deenergized to reduce driving, eddy-current brake means associated with said driven member, the eddy-current member of which brake means is also said eddy-current member of the eddy-current coupling, the eddy currents due to both coupling and braking occurring in a common portion of said eddy-current member, a second field coil in the eddy-current brake means adapted to be energized to effect a resistance to motion of the driven member and to be deenergized to reduce resistance, and an electrical control circuit connected to said coils and arranged for alternatively energizing them.

20. In apparatus of the class described, a driven member, driving means therefor including an electrical eddy-current coupling having an eddy-current member, a field coil for the coupling adapted to be energized to effect driving and to be deenergized to reduce driving, eddy-current brake means associated with said driven member, the eddy-current member of which brake means is also said eddy-current member of the eddy-current coupling, the eddy currents due to both coupling and braking occurring in a common portion of said eddy-current member, a second field coil in the eddy-current brake means adapted to be energized to effect a resistance to motion of the driven member and to be deenergized to reduce resistance, an electrical control circuit connected to said coils and arranged for alternatively energizing them, and means driven by said driven member and adapted to control said circuit according to the speed of the driven member.

ANTHONY WINTHER.